March 2, 1965 C. E. NICOLAIDES 3,171,697
BALL BEARINGS
Filed Feb. 23, 1962 2 Sheets-Sheet 1
FIG. 1
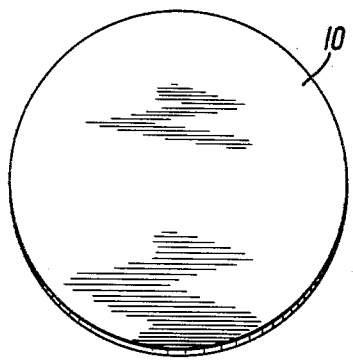
FIG. 2
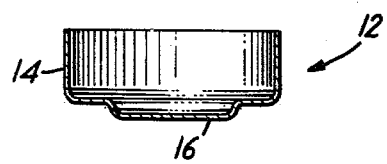
FIG. 3B  FIG. 3A  FIG. 3
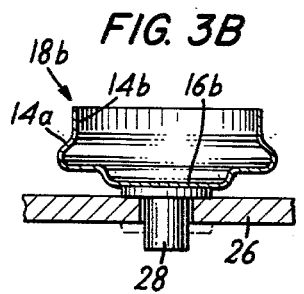 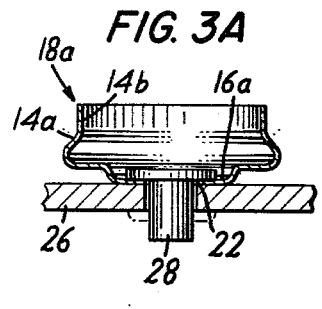 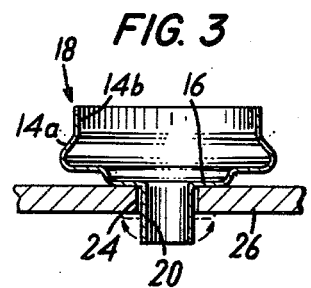
FIG. 4
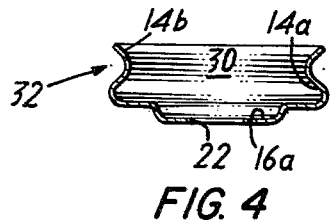
FIG. 5
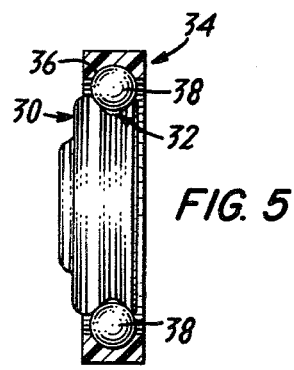
INVENTOR.
CONSTANTINE EMMANUEL NICOLAIDES
BY Bernard Olcott
ATTORNEY March 2, 1965  C. E. NICOLAIDES  3,171,697
BALL BEARINGS Filed Feb. 23, 1962  2 Sheets-Sheet 2

PAINT SPRAY

INVENTOR.
CONSTANTINE EMMANUEL NICOLAIDES
BY Bernard Olcott
ATTORNEY

United States Patent Office 3,171,697
Patented Mar. 2, 1965

3,171,697
BALL BEARINGS
Constantine Emmanuel Nicolaides, Neofyton Vamva 7, Athens, Greece
Filed Feb. 23, 1962, Ser. No. 175,186
6 Claims. (Cl. 308—3.8)

This invention relates to ball bearings and particularly to ball bearings having components fabricated from sheet metal.

Generally, it is known in the prior art to fabricate ball bearings by employing at least four parts, not counting the balls, but counting a shaft fixed to one of the race members. These parts are: one race member, a shaft, and a two-part second race member to permit assembly with the balls between the races. A typical bearing employs a single integral outer race member, and a two-part inner race member one part of which is secured to a shaft after the balls are positioned between the races. Often a fifth component, a ball cage, is used to assure proper and dependable roller action.

Ball bearings according to the present invention are particularly useful for applications in mass production manufacture of sheet metal furniture such as desks and file cabinets with sliding doors.

It is an object of the invention to provide a ball bearing consisting of as little as two parts counting the shaft, but not the balls.

Another object of the invention is to fabricate an improved ball bearing entirely of sheet metal components by simple stamping operations in a press.

Still another object of the invention is to provide an improved ball bearing which has a feature to shield the balls and the rolling surfaces therefor from paint accidentally sprayed upon the exposed end of the bearing.

According to a principal embodiment of the invention, there is provided a ball bearing comprising an integral sheet metal inner race member having an end wall and a peripheral face with a V-shaped surface thereon, the end wall being adapted for securing the inner race to a slidable member, an integral sheet metal outer race member having an end wall portion, said outer race being bent to form a V-shaped cavity facing and aligned with the V-shaped surface on the inner race, and a plurality of balls disposed between the V-shaped surface in the inner race member and the V-shaped cavity in the outer race member.

Other objects and features of the present invention will be set forth or apparent in the following description and claims, and illustrated in the accompanying drawings which disclose by way of example and not by way of limitation, in a limited number of embodiments, the principle of the invention and structural implementations of the inventive concept.

In the drawings, in which like reference numbers designate like components in the several views:

FIGURE 1 is a perspective view of a single blank of sheet metal for forming an integral inner race member;

FIGURE 2 is a cross-sectional view of the blank of FIGURE 1 after a first stamping operation;

FIGURE 3 is a cross-sectional view of the structure of FIGURE 2 after a subsequent stamping operation;

FIGURE 3A is an alternative cross-sectional shape of the structure of FIGURE 3;

FIGURE 3B is a second alternative cross-sectional shape of the structure of FIGURE 3;

FIGURE 4 is a cross-sectional view of the structure of FIGURE 3B after a subsequent stamping operation to form the integral inner race member;

FIGURE 5 is one embodiment of an improved ball bearing according to the invention;

Figure 6:
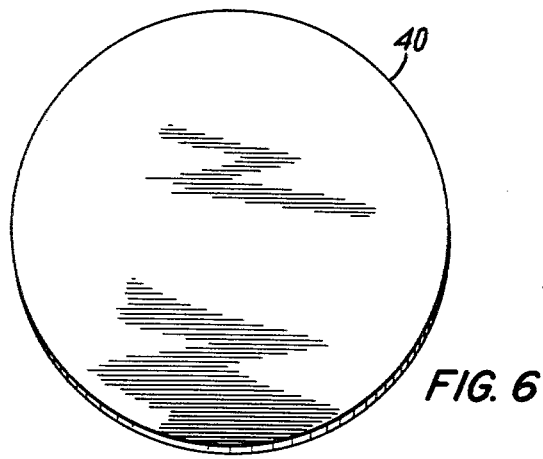
FIGURE 6 is a perspective view of a single blank of sheet metal for forming an integral outer race member.

All embodiments of the present invention have an integral inner race member fabricated from a single blank of sheet metal. As shown in FIGURES 1A and 1B, the fabrication of such an inner race member may start by shaping a circular blank 10 of sheet metal, as by stamping in a punch press, into a dished structure 12 having a cross-section as illustrated in FIGURE 2. Structure 12 comprises an upstanding annular portion 14 which later becomes the inner race and an end wall portion 16.

As a second punching operation, structure 12 may be pressed into the shape of structure 18 in FIGURE 3, or alternatively 18a in FIGURE 3A or 18b in FIGURE 3B. In FIGURES 3, 3A and 3B, the annular portion 14 of FIGURE 2 is shaped into one half of a V-shaped inner race 14a, while the other half of the V-shaped inner race 14b remains upstanding. The basic differences between structures 18, 18a and 18b are that as shown in FIGURE 3 a shaft 20 is punched integrally from end wall 16; in FIGURE 3A, end wall 16a has an aperture 22 punched therein; and in FIGURE 3B, end wall 16b remains unpunctured. The integral sheet metal shaft 20 of FIGURE 3 can at a later time be inserted into an aperture 24 in a member 26, such as a desk or file drawer to be slidably supported, and hammered over as shown in dashed lines in FIGURE 3 to rigidly secure member 26 to the inner race member 18. Alternatively, in FIGURES 3A and 3B, an ordinary rivet 28 can serve as a shaft member by spot welding it to the end wall portion 16a or 16b, the rivet first being inserted in aperture 22 in FIGURE 3A so that the underside of the head of rivet 28 is properly seated on the end wall 16a. Rivet shaft member 28 can be secured at a later time to the slidably supported member 26 by hammering over the end of the rivet as shown in dashed lines in FIGURES 3A and 3B.

The final shaping operation of the one-piece sheet metal inner race member 30 is shown in FIGURE 4. FIGURE 4 illustrates the structure of FIGURE 3A pressed to complete the V-shaped inner race 32 by deflecting wall 14b from the position shown in FIGURES 3, 3A and 3B to the position shown in FIGURE 4.

In FIGURE 5, a completed ball bearing comprises the integral sheet metal inner race member 30 of FIGURE 4 and an outer race member 34 of plastic, such as nylon, Teflon or Mylar, formed with an internal race groove 36 having a radius of curvature corresponding to a plurality of balls 38 which are retained by the co-action of the V-shaped groove 32 in the inner race 30. Such balls 38 are readily pressed into the position shown in FIGURE 5 since the plastic outer race member 34 is flexible and can temporarily be stretched or distorted without taking an unwanted permanent shape which would not retain the balls 38.

Figure 7:
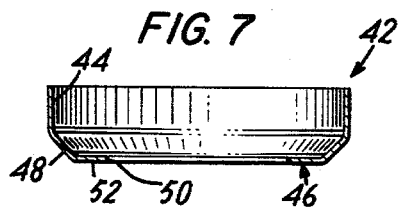
FIGURE 7 is a cross-sectional view of the blank of FIGURE 6 after a first stamping operation.

In a preferred embodiment of the invention, the outer race member in its entirety is also fabricated from a single blank of sheet metal. The fabrication of such an outer race member may start by shaping a circular blank 40 of sheet metal, shown in FIGURE 6, as by stamping in a punch press, into a dished structure 42 having a cross section as illustrated in FIGURE 7. Structure 42 comprises an upstanding annular portion 44, an end wall portion 46, and a sloping portion 48 therebetween which will serve as one half of a V-shaped outer race.

Optionally, the structure 42 may have an aperture 50 punched in end wall 46 which will facilitate the welding of rivet 28 as shown in FIGURE 3A if such shaft member is to be secured to the inner race 30 after the ball bearing is completely assembled. Aperture 50, together with the stamping of identification numbers on portion 52 of end wall 46, may be a separate second operation or combined with the single operation forming structure 42.

Figure 8:
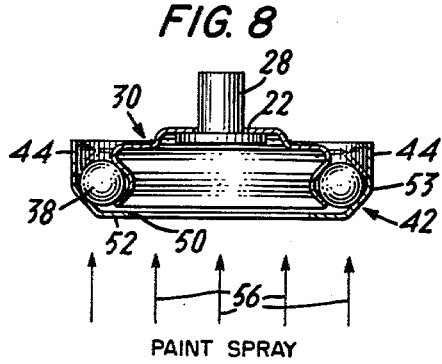
FIGURE 8 is a cross-sectional view of another embodiment of the invention showing the final assembly of the inner race member of FIGURE 4 and the outer race member of FIGURE 7.

As a subsequent operation, the inner race member 30 of FIGURE 4 is inverted and positioned inside of member 42 of FIGURE 7, as shown in FIGURE 8. Thereafter, a plurality of balls, such as 38 in FIGURE 5, is placed in the space between the inner race member 30 and the outer race member 42 and the upstanding lip portion 44 is pressed over the balls 38 to both complete a V-shaped outer race and to axially secure the inner race member 30 to the outer race member 42 with the balls 38 retained therebetween. After such assembly, the rivet shaft member 28 can be spot welded through the aperture 50 in the outer race member 42 as mentioned hereinbefore.

Figure 9:
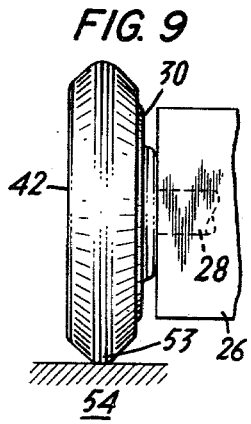
FIGURE 9 is an end view of the bearing of FIGURE 8 utilized to slidably support a member relative to another surface; and, FIGURE 10 is a cross-sectional view of a modification of the outer race member of FIGURE 8 to rotatably support a member fixed to said inner race.

It is important to observe that the entire ball bearing assembly, except for the balls, consists of only two integral one-piece members 30 and 42, even if it includes a shaft when the inner race member 18 is constructed according to FIGURE 3. Generally, it is intended that the ball bearing be installed as shown in FIGURE 9, wherein the axis of the bearing is horizontal, the bearing being loaded in a transverse direction by the engagement of the outer surface 53 of the outer race member 42 with a supporting surface 54 when member 26 is to be slidably supported by fixing it to rivet 28 of FIGURE 8 or shaft portion 20 of FIGURE 3. Conveniently, the outer periphery 53 of the V-shaped outer race member 42 permits the outer race member 42 to also act as a roller to engage and roll along the surface 54 which is shown as horizontal.

Unlike other types of ball bearings, the surfaces of the races which engage the balls 36 are not grooved and no cage for the balls is necessary for dependable rolling action. Such features are particularly advantageous for low cost sheet metal construction since the walls are generally too thin for a grooving operation, which in any case would be quite costly. As shown in FIGURE 8, the V-shaped walls of the races of the inner 30 and outer 42 members are generally straight where they are tangent to the balls 38. Therefore, each ball under compression makes a four-point contact with the races if the construction and assembly is made with precision. However, even if the construction and assembly is not with precision, as is generally the case with mass-produced sheet metal operations, there will be at least a three-point contact between balls under compression and the two races. Accordingly, a smooth rolling action still results since theoretically only three points are required to fix a circular cross section of a spherical ball. Such features assure the utility of the sheet metal bearing according to the invention even under low precision mass production conditions.

It is to be noted that the balls 38 and the rolling surfaces of all races are protected by portion 52 of FIGURE 8 from paint accidentally sprayed in the direction 56 as is often the case during the final operations of manufacturing desk or file cabinet drawers after the inner races of the roller bearings are fixed to the slidably supported members.

Figure 10:
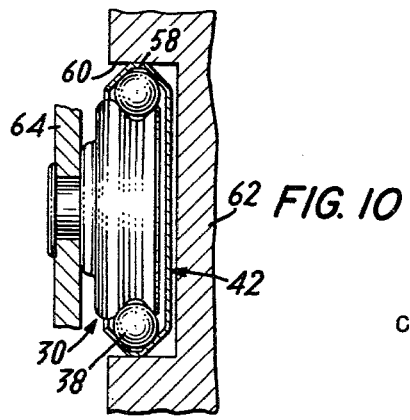

In another embodiment of the invention as shown in FIGURE 10, the outer portion 53 of FIGURE 8 can be shaped with a flat annular outside surface 58 to permit the outer race member 42 to be press fitted into a cavity 60 of a member 62 so that a member 64 fixed to the inner race member 30 can be rotarily supported relative to member 62.

While there has been described and pointed out the fundamental novel features of the invention as applied to preferred embodiments, it will be understood that various omissions and substitutions and changes in the form and details of the devices illustrated and its operation may be made by those skilled in the art without departing from the spirit of the invention. It is the intention, therefore, to be limited only as indicated by the scope of the following claims.

What I claim is:

1. A ball bearing comprising a stiff sheet metal circular inner race member shaped from a single sheet metal blank which has an end wall perpendicular to the axis of said inner race member and a radially outwardly opening peripheral groove having a ball contact portion of which is symmetrical about a plane perpendicular to the axis of said inner race member, said end wall being adapted to fixedly receive a coaxial cylindrical member for securing the inner race to a load member, a stiff sheet metal outer race member shaped from a single metal blank which has an end wall portion and a bent peripheral portion shaped to form a radially inwardly opening V-shaped cavity a ball contact portion of which is symmetrical about said plane and a plurality of balls disposed between said groove and said V-shaped cavity.

2. A ball bearing according to claim 1 wherein the walls of said groove and said V-shaped cavity are generally flat and planar at points of tangency with said balls.

3. A ball bearing according to claim 1 wherein the peripheral wall of the said inner race member has a cross section shaped generally as an S one end of which is tangent to said end wall of said inner race member, the half of said S opposite to said one end thereof constituting said groove.

4. A ball bearing according to claim 1 wherein said cylindrical member is integral with and depending from the end wall of said inner race member.

5. A ball bearing according to claim 1 wherein there is provided a concentric aperture in the end wall of said outer race member having a diameter less than the outer diameter of said inner race member whereby said balls and the rolling surfaces therefor are shielded from paint accidentally sprayed upon the end portion of the bearing opposite to said end wall portion of said inner race member.

6. A ball bearing according to claim 5 wherein said cylindrical member is a rivet having a shank and a head, said end wall of said inner race member has a concentric aperture at least as large as said shank but less than said head and said aperture in the end wall portion of said outer race member has a diameter at least as large as said head whereby said rivet may be passed through the aperture in said outer race member and its shank passed through said aperture of said inner race member for welding said rivet to said end wall portion of said inner race member.

References Cited by the Examiner

UNITED STATES PATENTS 836,639   11/06   Dunn _____ 308—195
998,099   7/11    Knipe _____ 308—195

(Other references on following page)

UNITED STATES PATENTS

| | | | |
|---|---|---|---|
| 1,489,013 | 4/24 | Schatz | 308—195 |
| 1,909,748 | 5/33 | Bohn | 308—195 |
| 1,927,466 | 9/33 | Menton | 308—195 |
| 1,963,592 | 6/34 | Pribil | 308—190 |
| 2,117,988 | 5/38 | Schock | 308—190 X |
| 2,161,210 | 6/39 | Waalkes | 308—190 |
| 2,174,325 | 9/39 | Large | 308—195 |
| 2,350,228 | 5/44 | Hanes | 308—6 X |
| 2,780,501 | 2/57 | Rosenberg | 308—6 |
| 2,805,107 | 9/57 | Van De Warker | 308—190 |
| 2,910,765 | 11/59 | Heim | 29—148.4 |
| 2,998,636 | 9/61 | Spence et al. | 29—148.4 |
| 3,054,164 | 9/62 | Recknagel | 308—193 X |
| 3,105,725 | 10/63 | Biesecker | 308—195 |

FOREIGN PATENTS 722,489 7/42 Germany.
730,426 5/55 Great Britain.

ROBERT C. RIORDON, *Primary Examiner.*

RICHARD A. DOUGLASS, FRANK SUSKO,
*Examiners.*